Patented Mar. 31, 1953

2,633,456

UNITED STATES PATENT OFFICE 2,633,456

PLASTIC FILM

Paul J. Vaughan, Kent, Ohio, assignor to Wingfoot Corporation, Akron, Ohio, a corporation of Delaware No Drawing. Application January 17, 1949, Serial No. 71,397

4 Claims. (Cl. 260—3.5)

This invention relates to a plastic film to be used for packaging and particularly for the packaging of food stuffs of an oily nature. The film is composed essentially of (1) rubber hydrochloride, (2) a copolymer of 1,3-butadiene and acrylonitrile (or other copolymer of this type, referred to below), and (3) an ester plasticizer. Such film has particular value in packages where high-tear and puncture-resistance are required. The resistance to puncturing is high even at low temperatures and the film may be used for frozen-food packaging. If an oil-resistant ester plasticizer is employed, the film is oil-resistant and can be used for packaging many articles such as putty, lard, margarine, etc. Although a colorless, transparent film will ordinarily be desired the film may be pigmented or dyed as desired.

Because of its high-tear and puncture-resistance the film has been found particularly satisfactory for the manufacture of margarine packages of the type described in Peters U. S. Patent No. 2,347,640. These packages include a capsule of coloring material which is to be broken and worked into the margarine before opening the package. The margarine is softened by warming to room temperature and after breaking the capsule, but before opening the package, the coloring material is kneaded into the margarine. Only a bag of an oil-resistant film of high-tear and puncture-resistance can be used for this purpose.

The copolymer of butadine and acrylonitrile has little plasticizing effect on rubber hydrochloride in the absence of an ester plasticizer. When used with an ester plasticizer, it has a very appreciable effect. After studying the results of varying the copolymer plasticizer content and the ester plasticizer content, the following general conclusions are reached. An increase in the copolymer plasticizer content (1) decreases the modulus quite rapidly at first, but more slowly at higher copolymer plasticizer levels and (2) decreases the tensile strength at first, then levels off, and finally with large additions of copolymer plasticizer the tensile strength decreases still further, (3) increases the elongation to a maximum at first, larger amounts causing a decrease in elongation to a value lower than that existing when no copolymer plasticizer is present, (4) increases the resistance to tear quite rapidly at first and more slowly at higher copolymer plasticizer levels, and (5) increases resistance to puncture quite rapidly at first and then more slowly at higher copolymer plasticizer levels.

An increase in the ester plasticizer content (1) decreases the modulus but the effect is less significant at higher concentrations of the plasticizer, (2) causes a slight decrease in the tensile strength which is nearly linear over the entire range of plasticizer additions, (3) slowly increases the elongation which increases almost linearly over the entire range of plasticizer additions, (4) although small additions have no effect on the resistance to tear, this increases sharply and finally levels off or even drops slightly at higher plasticizer levels, and (5) although small additions have no effect on the resistance to puncturing, this increases sharply as larger amounts are added and finally levels off.

The use of both copolymer plasticizer and ester plasticizer together produces a film having a combination of properties not obtainable with either plasticizer alone.

While there is some variation in the effect of different ester plasticizers the difference is chiefly one of degree. The ratio of the butadiene and acrylonitrile from which the copolymer is produced may vary from 50 parts of both monomers to 80 parts of butadiene and 20 parts of arcrylonitrile. In general, it may be said that there is no significant difference in the effect on the rubber hydrochloride produced by any such copolymer, regardless of its exact constitution.

In carrying out the invention any ester plasticizer may be employed such as, for example—

Butyl stearate
Dibutyl sebacate
Methoxyethyl oleate
Trioctyl phosphate
Polyethylene glycol di-2-ethyl hexoate
Dibutyl phthalate
Dioctyl phthalate
Diethoxyethyl phthalate
Dibutoxyethyl phthalate
Tricrestyl phosphate
Butoxyethyl stearate
Methoxyethyl acetyl ricinoleate
Tributoxy ethyl phosphate
Di methoxy ethyl phthalate
Di cyclohexyl phthlate
Methyl phthalyl ethyl glycolate
Acetyl tributyl citrate, etc.

The rubber hydrochloride used is advantageously prepared as described in Calvert U. S. 2,139,647.

The following illustrates how the copolymer can be made, the references to "parts" meaning parts by weight: Thirty-three parts of acrylonitrile are dispersed in a solution of 0.8 part of dodecyl mercaptan, and 0.3 part of potassium persulfate in 180 parts of water. Sixty-seven parts of 1,3-butadiene are added under pressure. The reaction is carried out at about 100° F. After about seventy-five per cent conversion the reaction is short-stopped by venting the excess butadiene and adding 0.1 part of hydroquinone. By varying the amount of mercaptan there is obtained a copolymer which is more or less easily dissolved in the solvent with the rubber hydrochloride and cast into film. The copolymer is separated from the liquid phase of the dispersion, washed with caustic solution, and dried and then used.

The film is formed from 100 parts by weight of rubber hydrochloride, 5 to 25 parts by weight of ester plasticizer and 25 to 40 parts by weight of the copolymer. Generally, the total plasticizer content may not exceed fifty parts. Films of higher plasticizer content have desirable properties although their softness necessitates special handling. For a relatively soft film, 12 to 15 parts of the ester plasticizer may be used to about 35 parts of the copolymer. Film of even this plasticizer content is difficult to handle on ordinary filming equipment and for that reason the content of ester plasticizer may of necessity be reduced to, for example, 7.5 parts per 100 parts of the rubber hydrochloride. In film to be used for the packaging of lard or oleomargarine and like oily compositions, butyl stearate is advantageously used as the ester plasticizer. For frozen goods dibutyl sebacate may be preferred and from 20 to 25 parts of ester plasticizer will generally be employed. The addition of 2 parts of opal wax (hydrogenated castor oil) per 100 parts of rubber hydrochloride lessens the tendency of the film to block on stacking. The tendency to block may likewise be decreased by roughening one or both surfaces of the film.

The film may be made in different thicknesses. For example, film 0.0024 to 0.0025 inch thick has been employed in manufacturing packages for margarine, such as described in the aforesaid Peters patent. Films of thinner gauge, for example, films about 0.002 inch thick may be used for this purpose. For frozen foods, films 0.001 inch thick up to 0.0012 or 0.0015 or even 0.0017 inch thick or thicker may be employed. The film is heat-sealable and thermo-sealable. The film is preferably made by casting and such films may be heated and stretched to produce films of desired thinness, such as films .00025 or .0004 inch thick, etc.

A preferred method of producing the film is to copolymerize the monomers in a solvent in which the rubber hydrochloride is soluble and mix the reaction product with a solution of the rubber hydrochloride, adding the ester plasticizer as desired. It is economical to use the same solvent for the rubber hydrochloride and copolymer because the solvent-recovery cost is thus minimized. Ordinarily benzene will be employed as the solvent and benzene-soluble copolymer will be used. Such copolymer will usually have a Mooney viscosity (small rotor) below 40, and high solubility in methylethyl ketone (the solvent ordinarily employed in testing the solubility of such copolymers).

Although throughout the specification reference is made more particularly to copolymers prepared from 1,3-butadiene and acrylonitrile it is to be understood that instead of 1,3-butadiene, isoprene may be used; and instead of acrylonitrile, methylacrylonitrile or ethacrylonitrile may be employed. Thus, the copolymer of isoprene and ethacrylonitrile or methacrylonitrile, etc. used in the ratios aforesaid may be employed in the amounts above indicated for the preparation of satisfactory film.

Copolymers produced from 70 parts of 1,3-butadiene and 25 parts of acrylonitrile; 65 parts of 1,3-butadiene and 35 parts of acrylonitrile; 67 parts of 1,3-butadiene and 33 parts of acrylonitrile; 35 parts of 1,3-butadiene and 45 parts of acrylonitrile, and equal parts of 1,3-butadiene and acrylonitrile have been employed in the production of film. More generally, it may be said that the copolymer may be produced from (1) 50 to 80 parts by weight of 1,3-butadiene or isoprene and (2) 50 to 20 parts by weight of acrylonitrile, methacrylonitrile or ethacrylonitrile.

Light stabilizers and other compounding ingredients may be added to the film as desired.

The composition of rubber hydrochloride, copolymer, and ester plasticizer has other uses than for film such as the production of filaments, etc.

What I claim is:

1. Flexible, heat-sealable, self-sustaining film for packaging, which film is .00025 to .0025 inch thick and is composed essentially of 100 parts by weight of rubber hydrochloride, 5 to 25 parts by weight of ester plasticizer of the class consisting of butyl stearate, dibutyl sebacate, methoxyethyl oleate, polyethylene glycol di-2-ethyl hexoate, butoxyethyl stearate, methoxyethyl acetyl ricinoleate, methyl phthalyl ethyl glycolate and acetyl tributyl citrate, and 25 to 40 parts by weight of copolymer obtained from 50 to 80 parts of 1,3-butadiene and 50 to 20 parts of acrylonitrile, the sum of the ester plasticizer and copolymer not exceeding 50 parts by weight.

2. The film of claim 1 in which the ester plasticizer is butyl stearate.

3. The film of claim 1 in which 7.5 parts of ester plasticizer is used with 35 parts of copolymer.

4. The film of claim 1 in which 7.5 parts of butyl stearate is used as the ester plasticizer with 35 parts of copolymer.

PAUL J. VAUGHAN.

REFERENCES CITED

The following references are of record in the file of this patent:

UNITED STATES PATENTS

| Number | Name | Date |
|---|---|---|
| 2,177,413 | Winkelmann | Oct. 24, 1939 |
| 2,205,654 | Ide et al. | June 25, 1940 |
| 2,273,436 | Desamari | Feb. 17, 1942 |
| 2,349,036 | Ferner | May 16, 1944 |
| 2,385,531 | Osterhof et al. | Sept. 25, 1945 |

FOREIGN PATENTS

| Number | Country | Date |
|---|---|---|
| 586,447 | Great Britain | Mar. 19, 1947 |
| 604,138 | Great Britain | June 29, 1948 |

OTHER REFERENCES

Official Digest No. 1946, No. 262, pp. 615–622.

Kenney, Modern Plastics, September 1946, pp. 106 and 107.

Young et al., pp. 1446–1452, Ind. & Eng., November 1947.